US008789684B2

(12) United States Patent
Hazenbroek

(10) Patent No.: US 8,789,684 B2
(45) Date of Patent: Jul. 29, 2014

(54) ROTATABLE ARTICLE SUPPORT FOR A CONVEYOR

(71) Applicant: Foodmate B.V., Oud-Beijerland (NL)

(72) Inventor: Jacobus Eliza Hazenbroek, Oud-Beijerland (NL)

(73) Assignee: Foodmate BV (NL)

( * ) Notice: Subject to any disclaimer, the term of this patent is extended or adjusted under 35 U.S.C. 154(b) by 0 days.

(21) Appl. No.: 13/655,951

(22) Filed: Oct. 19, 2012

(65) Prior Publication Data
US 2013/0037381 A1    Feb. 14, 2013

Related U.S. Application Data

(63) Continuation-in-part of application No. 13/011,060, filed on Jan. 21, 2011, now Pat. No. 8,360,232, and a continuation of application No. PCT/NL2011/050267, filed on Apr. 19, 2011.

(30) Foreign Application Priority Data

Apr. 19, 2010  (NL) ..................................... 2004574
Jan. 26, 2011  (NL) ..................................... 2006075

(51) Int. Cl.
    B65G 15/58        (2006.01)
(52) U.S. Cl.
    USPC ....................................... 198/679; 198/465.4
(58) Field of Classification Search
    USPC ......... 198/679, 678.1, 682, 377.1, 378, 465.4
    See application file for complete search history.

(56) References Cited

U.S. PATENT DOCUMENTS

| 3,956,794 A | 5/1976 | Verbakel |
| 3,969,790 A | 7/1976 | Smorenburg |
| 3,979,793 A | 9/1976 | Hazenbroek |

(Continued)

FOREIGN PATENT DOCUMENTS

| EP | 0 786 208 A1 | 7/1997 |
| EP | 1 538 113 A1 | 6/2005 |

(Continued)

OTHER PUBLICATIONS

European Search Report—NL 2004574, Jan. 3, 2011, Foodmate B.V.

(Continued)

Primary Examiner — James R Bidwell
(74) Attorney, Agent, or Firm — Womble Carlyle Sandridge & Rice LLP

(57) ABSTRACT

An article support is disclosed for movement by a conveyor along a conveying path that has treatment units and turning stations there along. The article support includes a carriage for engagement by a conveyor, and a holder for supporting an article that is rotatably mounted to the carriage. A turning gear is associated with the holder to enable rotation of a supported article about a vertical axis with respect to the carriage. Rotation is effected in response to the article support being moved past a turning station along a conveying path. Indexing arrangements are further operatively arranged between the turning gear and the carriage for indexing at least a first and a second position of incremental rotation. The indexing arrangements include first and second pairs of confronting magnetic elements. The magnetic elements are each positioned in accordance with the relevant first and second incremental rotational positions. The article support in particular is useful as a rotatable hanger assembly for food processing equipment, such as poultry and fowl processing lines.

27 Claims, 9 Drawing Sheets

(56) References Cited

U.S. PATENT DOCUMENTS

| | | |
|---|---|---|
| 3,983,601 A | 10/1976 | Verbakel |
| 3,990,128 A | 11/1976 | van Mil |
| 4,011,573 A | 3/1977 | Braico |
| 4,034,440 A | 7/1977 | van Mil |
| 4,096,950 A | 6/1978 | Brook |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van den Nieuwelaar et al. |
| 4,724,581 A | 2/1988 | van den Nieuwelaar |
| 4,736,492 A | 4/1988 | Hazenbroek et al. |
| RE32,697 E | 6/1988 | Hazenbroek et al. |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A | 12/1988 | Hazenbroek et al. |
| 4,811,456 A | 3/1989 | Heuvel |
| 4,811,458 A | 3/1989 | v. d. Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek et al. |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van nen Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,490,451 A | 2/1996 | Nersesian |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A | 2/1998 | Schoenmakers et al. |
| 5,741,176 A | 4/1998 | Lapp et al. |

(56) References Cited

U.S. PATENT DOCUMENTS

| | | | |
|---|---|---|---|
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,530,466 B2 | 3/2003 | Murata et al. |
| 6,599,179 B1 | 7/2003 | Hazenbroek et al. |
| 6,612,919 B2 | 9/2003 | Janset et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 8,360,232 B2 * | 1/2013 | Hazenbroek ............... 198/682 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van Den Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| EP | 2 181 841 A1 | 5/2010 |
| FR | 2 529 177 A1 | 12/1983 |
| GB | 1 395 722 A | 5/1975 |

OTHER PUBLICATIONS

Written Opinion—NL 2004574, Jan. 3, 2011, Foodmate B.V.
PCT/NL2011/050267—International Preliminary Report on Patentability, Oct. 23, 2012, Foodmate B.V.

* cited by examiner

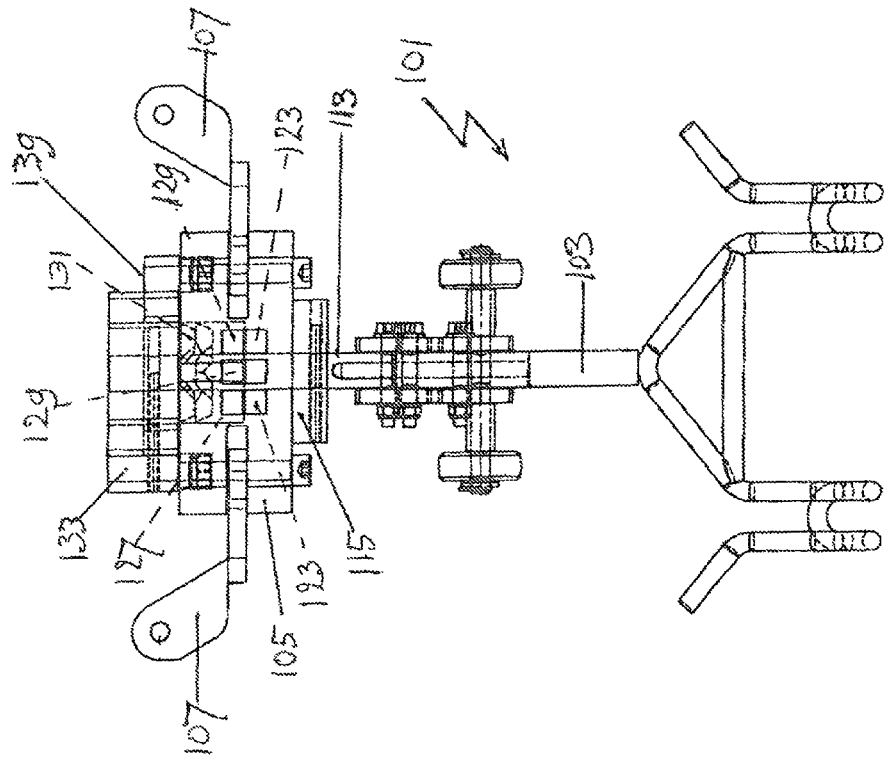
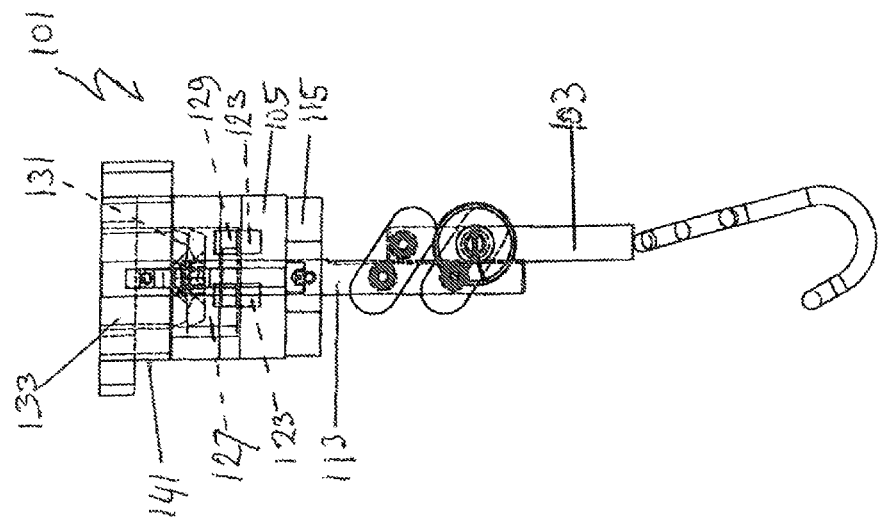

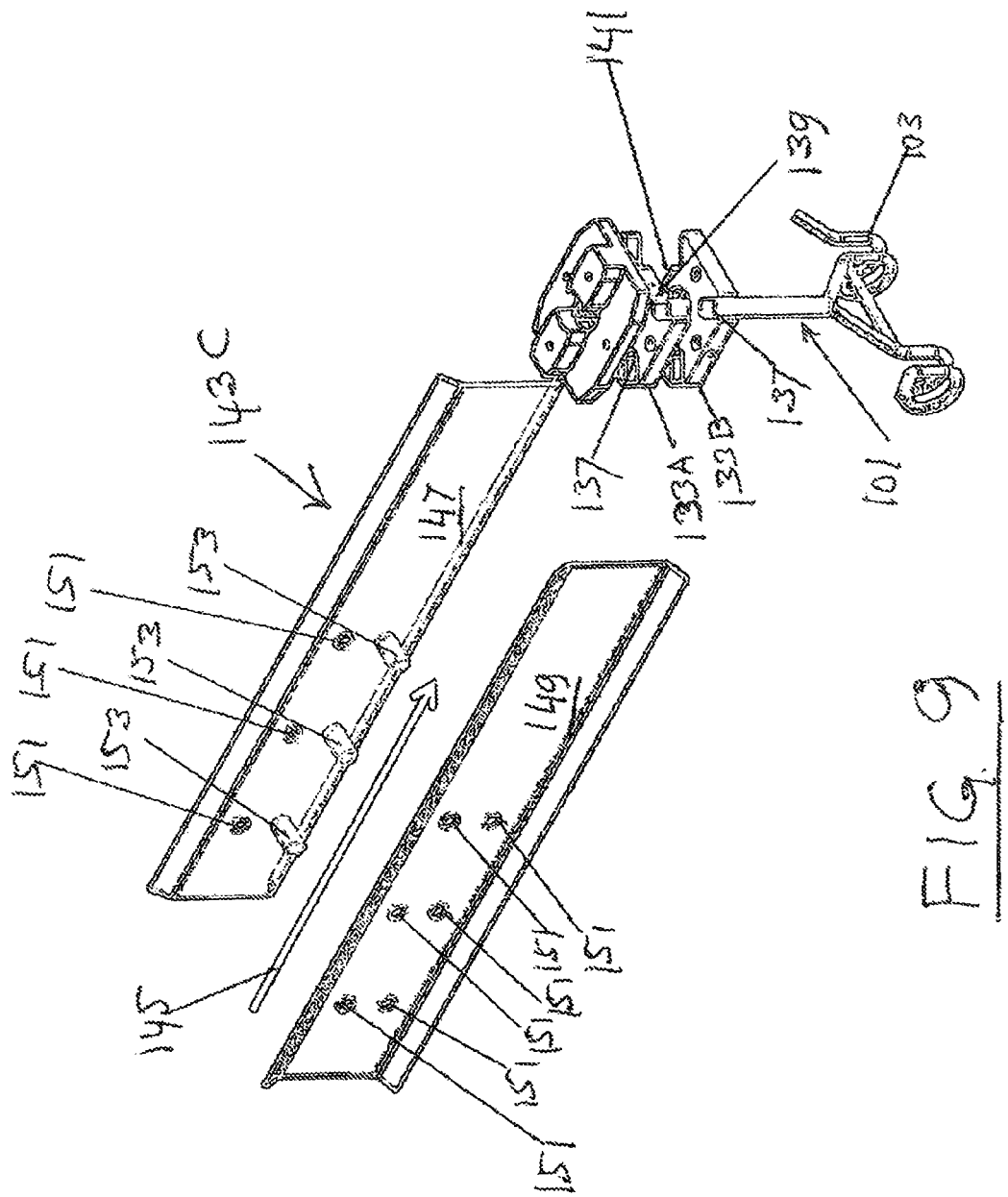

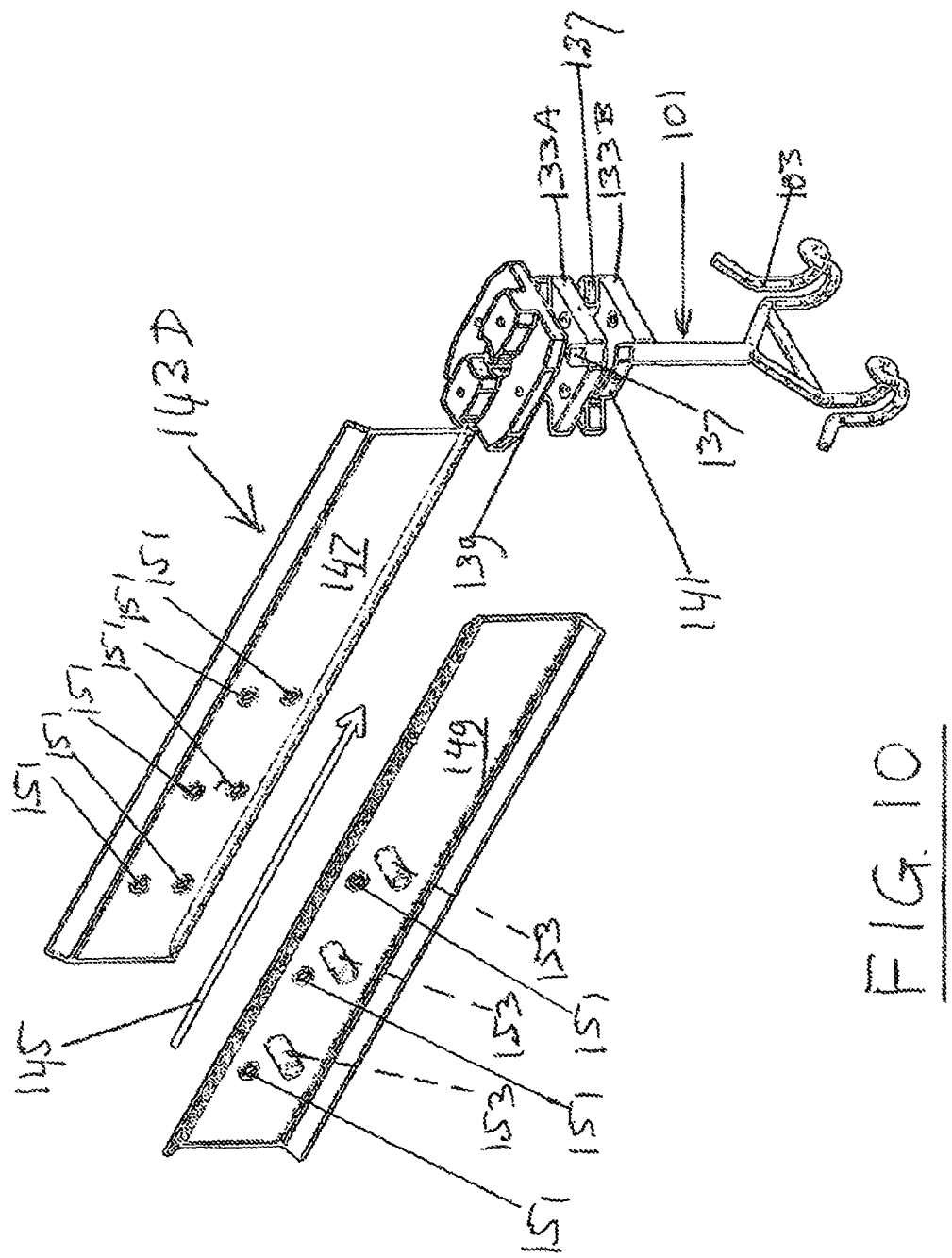

ROTATABLE ARTICLE SUPPORT FOR A CONVEYOR

The present disclosure relates to article supports for conveyor systems and to such conveyor systems including an alignment station. The invention also relates to rotatable suspension hangers for overhead conveyor systems. In particular the invention relates to such rotatable suspension hangers as used in processing lines for slaughtered animals, to suspend the animal carcasses by their legs for movement past subsequent processing stations.

Article supports for conveyor systems that comprise a trolley and a rotatable article holder or shackle are well known in the poultry processing industry. One suitable example is described in EP 0786208, which discloses a shackle for suspending poultry by their legs for movement by a conveyor track of a poultry processing line along individual processing stations. Thereby a trolley assembly is supported and guided along a conveyor track and moved there along by a transport chain. The poultry suspension hooks are rotatably mounted to the trolley and an associated turning gear is adapted to cooperate with means along the track to rotate the poultry suspension hooks in predetermined rotary positions. At the location of individual processing stations the turning gear is usually retained between opposite parallel side guides to inhibit any rotation when the suspended poultry carcass is being processed at an individual processing station. In between the processing stations these parallel side guides may be interrupted. The side guides are also interrupted where the turning gear is engaged by means to effect its rotation. To this end the turning gear, which is a substantially square body, has slots extending inwardly from its corners. These slots are engageable by a turning pin positioned along the conveyor path. A yieldable indexing arrangement between the trolley and the turning gear ensures that the rotary position is retained when moving further along the track. This is of particular importance at locations where the lateral side guides are interrupted. The yieldable index arrangement includes a spring biased ball and socket assembly with a cavity for holding the ball and spring on one of the relatively rotatable parts and a ball receiving recess on the other relatively rotatable part. The characteristics of mechanical tension springs are not always compatible with the yieldability requirements of rotatable article support assemblies. It is important from a safety perspective that such hangers give way when human beings accidentally obstruct the path of conveyance. Thus while there is a need for relatively firm indexing, there is also a somewhat conflicting need for relatively forceless disturbance of the indexed positions. While such indexing arrangements are indispensible to ensure proper operation of the rotating mechanism, it is also highly undesirable in food processing equipment to have cavities or recesses that are difficult to clean. Such difficult to clean cavities and recesses can pose serious hazards of bacterial contamination.

Accordingly it is an object of the present invention to propose an improved suspension hook for an overhead conveyor. In a more general sense it is an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful choice.

To this end the invention provides an article support assembly and a conveyor system for conveying articles along processing stations including the article support assembly, as defined by one or more of the appended claims. Such an article support assembly is more efficient than those of the prior art. It has been found that the magnetic repulsion also better meets the somewhat conflicting requirement of a relatively firm indexing and an ability of relatively forceless disturbance of the indexed positions.

To this end the invention also provides an article support for movement by a conveyor along a conveying path having treatment units and turning stations there along, the article support including: a carriage for engagement by a conveyor; a holder for supporting an article and being rotatably mounted to the carriage; a turning gear associated with the holder to enable rotation of a supported article about a vertical axis with respect to the carriage in response to being moved past a turning station along a conveying path; and indexing means operatively arranged between the turning gear and the carriage for indexing at least a first and a second position of incremental rotation, wherein the indexing means include first and second pairs of confronting magnetic elements, each being positioned in accordance with the relevant first and second incremental rotational positions. Such indexing positions are obtainable without any mechanical contact and contamination build-up is thereby substantially reduced. Also wear is entirely eliminated as well as any noise production. The incremental indexing positions are thus strictly defined, but are also resiliently yieldable about the exact positions, which greatly enhances a smooth transition from one indexing position into the other.

In a preferred embodiment the indexing means may index a third position of incremental rotation and include a confronting third pair of confronting magnetic elements. The indexing means of such a preferred embodiment may additionally and optionally also index a fourth position of incremental rotation and include a confronting fourth pair of confronting magnetic elements. In such a particular embodiment the turning gear can include a turning cross having a substantially square peripheral contour with four corner apexes. In such a configuration each corner apex may define an inwardly extending slot that opens into its apex, the slots thereby being arranged for engagement by a turning station. Such an embodiment would in particular be suitable for use in combination with a conveyor and turning station of the type disclosed in EP 0786208.

In combination with any of the afore proposed embodiments it would be further preferred when the pairs of confronting magnetic elements each include an upper magnet in a lower face of the carriage and a lower magnet in an upper face of the turning cross. Preferably thereby the lower face of the carriage is part of a separately mounted base part of the carriage. This in particular enables the turning cross to be rotatably mounted to the base part.

In general it is also preferable for the magnetic elements to include Neodymium. This rare earth magnetic material is very strong and allows the magnetic elements to be very powerful and yet be of relatively modest size.

Also generally it would be preferable for the carriage to include a chain block for receiving a conveyor chain. Thereby the carriage can be conveniently adapted to be supported for movement along an overhead conveyor track.

In a particularly preferred embodiment the article support takes the form of a suspension hook for supporting fowl or poultry carcasses by their legs from the overhead conveyor track. Thereby the holder can further take the form of a shackle having first and second hooks depending therefrom for receiving the leg parts of fowl or poultry carcasses.

A further preferred embodiment may include an article support assembly for movement by a conveyor along a conveying path having processing stations and turning stations therealong, the article support comprising: a carriage for engagement with the conveyor; a holder mounted to the carriage, the holder being configured to support an article being moved along the conveying path; the holder being rotatably mounted with respect to the carriage; a turning block associated with the holder, rotation of the turning block causing corresponding rotation of the holder relative to the carriage; position locks operatively arranged between the turning block and the carriage for holding the turning block yieldably in at least a first and a second incremental indexed orientation with respect to the conveying path; the position locks comprising magnetic elements including elements configured to align substantially when the turning block is in the first indexed orientation and elements configured to align substantially when the turning block is in the second indexed orientation.

Also an article support assembly may be preferred for supporting articles as they are moved along a processing path by a conveyor, the article support assembly comprising: a carriage mountable to the conveyor for movement therealong; an article holder depending from the carriage and configured to receive and hold articles to be moved along the processing path; the article holder being rotatable with respect to the carriage; and at least one pair of magnets associated with the carriage and the holder, the magnets of the pair being positioned and configured to align substantially with each other when the article holder is in at least one predetermined rotary orientation with respect to the carriage to maintain the holder yieldably in the predetermined rotary orientation.

An aspect of the invention may further be a method of establishing yieldable indexed orientations of a poultry shackle with respect to a conveyor carriage from which it depends, the method comprising magnetically attracting the poultry shackle to each of the indexed orientations as the poultry shackle is rotated toward the indexed orientations. This method may be one wherein the step of magnetically attracting comprises mounting a magnet in a fixed position relative to the carriage and mounting a magnet in a fixed position relative to the shackle with the magnets being located to align substantially when the poultry shackle is in an indexed orientation.

Further the invention may be advantageously embodied as a poultry shackle assembly comprising: a carriage; a base on the carriage; a turning block rotatably mounted with respect to the base; a shackle mounted to the turning block and being rotatable therewith; a first magnet mounted in the turning block adjacent the base; and a second magnet mounted in the base adjacent the turning block; the first and second magnets being located to align substantially with each other when the turning block and shackle are in a predetermined rotary orientation with respect to the carriage.

Accordingly an article support assembly is disclosed for movement by a conveyor along a conveying path that has processing stations and turning stations therealong. The article support includes a carriage for riding along the conveyor and a holder depending from the carriage for supporting an article. The holder is rotatably mounted with respect to the carriage. A turning block is associated with and rotates with the holder to enable rotation of a supported article when the turning block is rotated. Rotation is effected in response to the article support, and particularly the turning block, being moved past a turning station along a conveying path. Position stops are operatively arranged between the turning block and the carriage for holding the turning block and thus the holder yieldably in at least one predetermined indexed orientation relative to the carriage. The position stops include at least one pair of confronting magnetic elements associated with the carriage and the turning block and located to align with each other when the turning block and holder are in the predetermined indexed orientation. The turning block is thus held in its indexed orientation by magnetic attraction between the pair of magnets. The article support in particular is useful as a rotatable hanger assembly for food processing equipment, such as poultry and fowl processing lines. Such an article support is useful as a hanger assembly for food processing equipment, such as poultry and fowl processing lines, because it reduces cavities and mechanical contact areas and thereby the risk of contamination and bacterial growth. The hanger assembly according to the invention may also be useful in general industrial processing equipment, because its indexing means has no mechanical contact and thereby reduces friction, wear and noise.

Further advantageous aspects of the invention will become clear from the appended claims and from the following description of preferred embodiments.

The invention will be further explained in reference to the accompanying drawings, in which:

FIG. 5 is a side elevation in ghost view of the article support of FIGS. 3 and 4;

FIG. 6 is a rear elevation in ghost view of the article support of FIGS. 3, 4 and 5;

FIG. 9 shows a third arrangement of turning pins in relation to a third output position for the article support; and FIG. 10 shows a fourth arrangement of turning pins in relation to a fourth output position for the article support.

Figure 1:
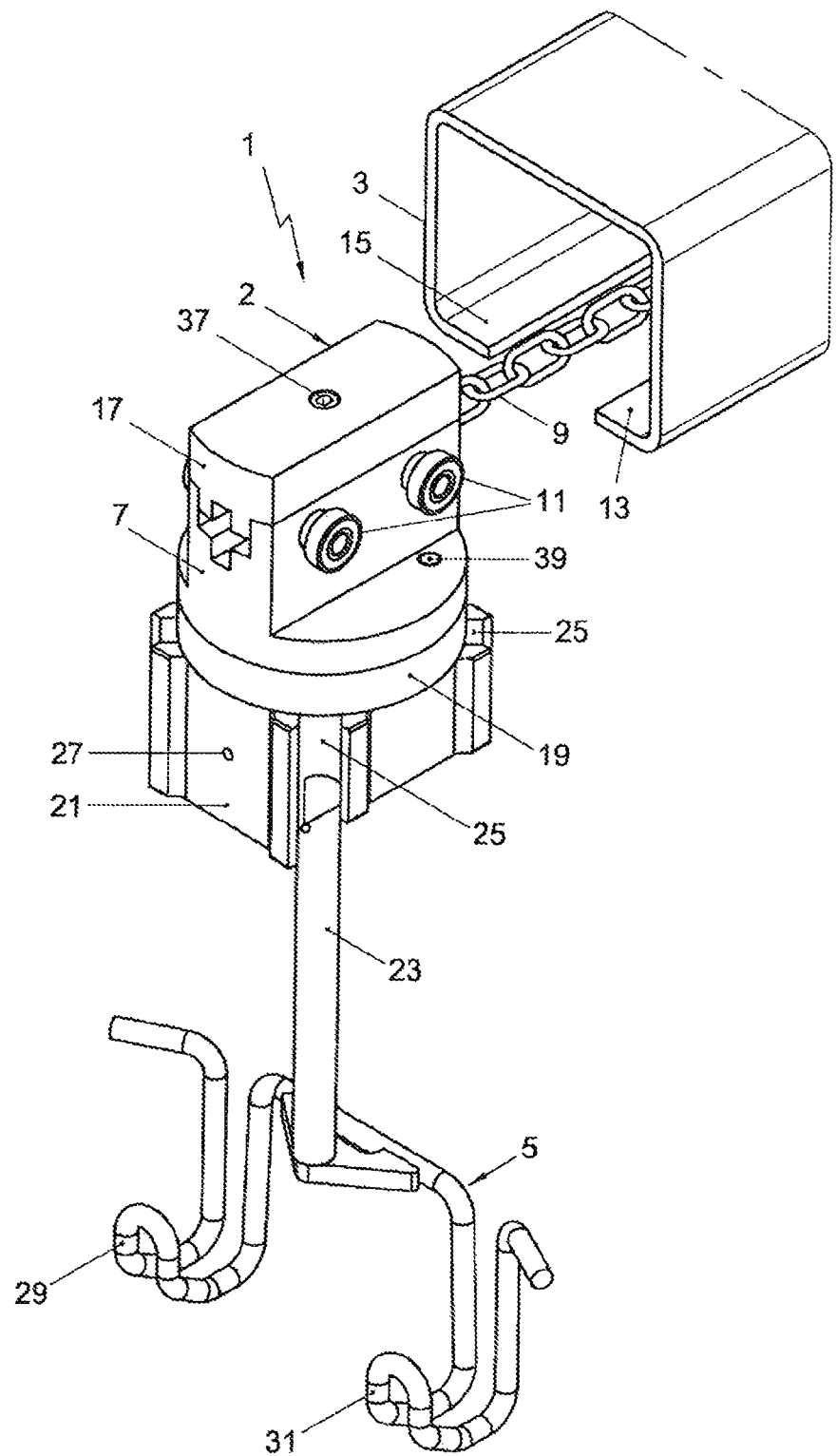
FIG. 1 shows the rotatable suspension hook of the invention in position for engagement with an overhead conveyor.

Referring to FIG. 1 it is seen that the suspension hook 1 is composed of an upper carriage part 2 that can be transported along an overhead conveyor track 3 and a shackle 5 forming a lower part of the suspension hook 1. The upper carriage part 2 of the suspension hook 1 includes a chain block 7 that is engaged by a conveyor chain 9. For clarity the conveyor chain 9 is only shown as extending from one end of the chain block 7 in the conveyor track 3, but the conveyor chain 9 would normally extend from both ends of the chain block 7 to interconnect a plurality of suspension hooks 1 at regularly spaced intervals along the conveyor track 3. The chain block 7 is provided with rollers 11 to support it for movement on the inturned flanges 13, 15 of conveyor track 3.

The chain block 7 of the carriage part 2 has a chain cap 17 to enable connection and adjustment to the transport chain 9. The carriage part 2 further has a base part 19 that is attached at a lower face of the chain block 7. A turning cross 21 is pivotally attached to the base part 19 of the carriage part 2, so as to be pivotable about a vertical axis. In this example a shaft 23 carrying the shackle 5 is aligned with the vertical axis about which the turning cross 21 rotates together with the shackle 5. However it is possible to have the shackle 5 offset with respect to the pivot axis of the turning cross, so that pivoting of the shackle may be used to move the shackle out of the conveyor path to bypass certain stations along the conveyor path.

The turning cross 21 has four sides and four slots 25 on its corners to effect rotation as described in aforementioned EP 0786208, which is hereby incorporated by reference. The shaft 23 is non-rotatably fixed to the turning cross 21 by a pin engaged in a throughbore 27. At the lower end of the shaft 23 the shackle 5 has a pair of first and second hooks 29, 31 for holding legs of a fowl or poultry carcass. However, it will be clear that other elements could depend from the shaft 23 when it is desired to transport articles other than carcasses between processing or treating stations by means of a conveyor.

Figure 2:
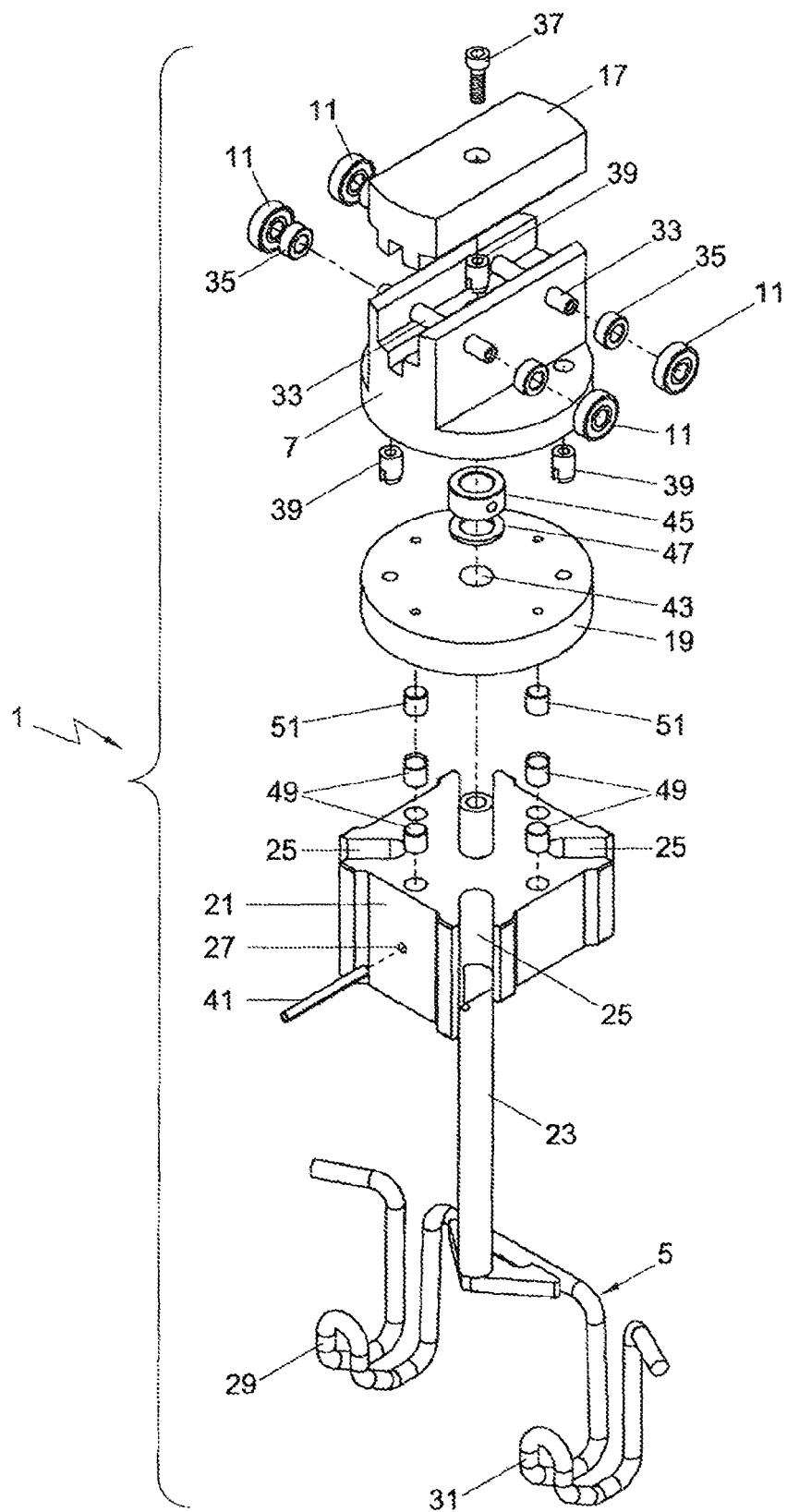
FIG. 2 shows the rotatable suspension hook of FIG. 1 in an exploded arrangement.

FIG. 2 shows the suspension hook 1 of FIG. 1 in an exploded arrangement. The chain block 7 is shown with the chain cap 17 lifted and its interior exposed. Transverse shafts 33 can be used in locating the chain links of the conveyor chain and on their lateral ends transverse shafts each carry a relevant one of the rollers 11. The rollers 11 are each spaced from the body of the chain block 7 by distance collars 35. The chain cap 17 is mountable to the chain block 7 by a screw 37. Because the chain block 7 is conveniently made from a plastic material, such as Nylon, a screw threaded metal mounting insert 39 may be employed. Further mounting inserts 39 may also be employed for the fixation of the base part 19 to the chain block 7 by additional screw fasteners (not shown, but conventional). The base part 19 pivotally supports the turning cross 21 by a top end of the shaft 23 that extends centrally through the turning cross 21. The shaft 23 being non-rotatably fixed by a cross pin 41 engageable in throughbore 27 and through a corresponding transverse bore in the shaft 23. The top end of shaft 23 extends through a central bore 43 in the base part 19 to be clamped by a retaining collar 45. The retaining collar 45 may be separated from the top surface of the base part 19 by a washer 47.

Inserted in corresponding cavities in the top surface of the turning cross 21 are lower magnets 49. The lower magnets 49 correspond in number to the four index positions defined by the turning cross 21 as described in before referenced EP 0786208. Other configurations with a different number of lower magnets are of course easily conceivable by the skilled person. Received in a lower face of the base part 19 are a corresponding number of upper magnets 51 of which only two are visible in FIG. 2. These lower and upper magnets 49, 51 can be typically sintered rare earth magnets containing Neodymium or ceramic magnets of Ferrite material. With the polarity of the paired lower and upper magnets 49, 51 properly directed, strong indexing positions are established by the confronting magnets attracting one another. A significant advantage is that these indexing positions are obtainable without any mechanical contact. Thereby the risk of a build-up of contamination is reduced, but also the problem of wear is eliminated. Furthermore the incremental indexing positions while being strictly defined, are at the same time also resiliently yieldable about their exact positions. This yieldability greatly enhances the smooth transition from one indexing position into the other and without any noise production.

Thus an article support 1 is disclosed for movement by a conveyor 3 along a conveying path that has treatment units and turning stations there along. The article support 1 includes a carriage 2 for engagement by a conveyor 3, and a holder 5 for supporting an article that is rotatably mounted to the carriage 2. A turning gear 21 is associated with the holder 5 to enable rotation of a supported article about a vertical axis with respect to the carriage 2. Rotation is effected in response to the article support 1 being moved past a turning station along a conveying path (such as explained in more detail in EP 0786208). Indexing means are further operatively arranged between the turning gear 21 and the carriage 2 for indexing at least a first and a second position of incremental rotation. The indexing means include first and second pairs of confronting magnetic elements 49, 51. The magnetic elements 49, 51 are each positioned in accordance with the relevant first and second incremental rotational positions. This article support 1 in particular is useful as a rotatable suspension hanger for food processing equipment, such as poultry and fowl processing lines that include an overhead conveyor.

Figure 3:
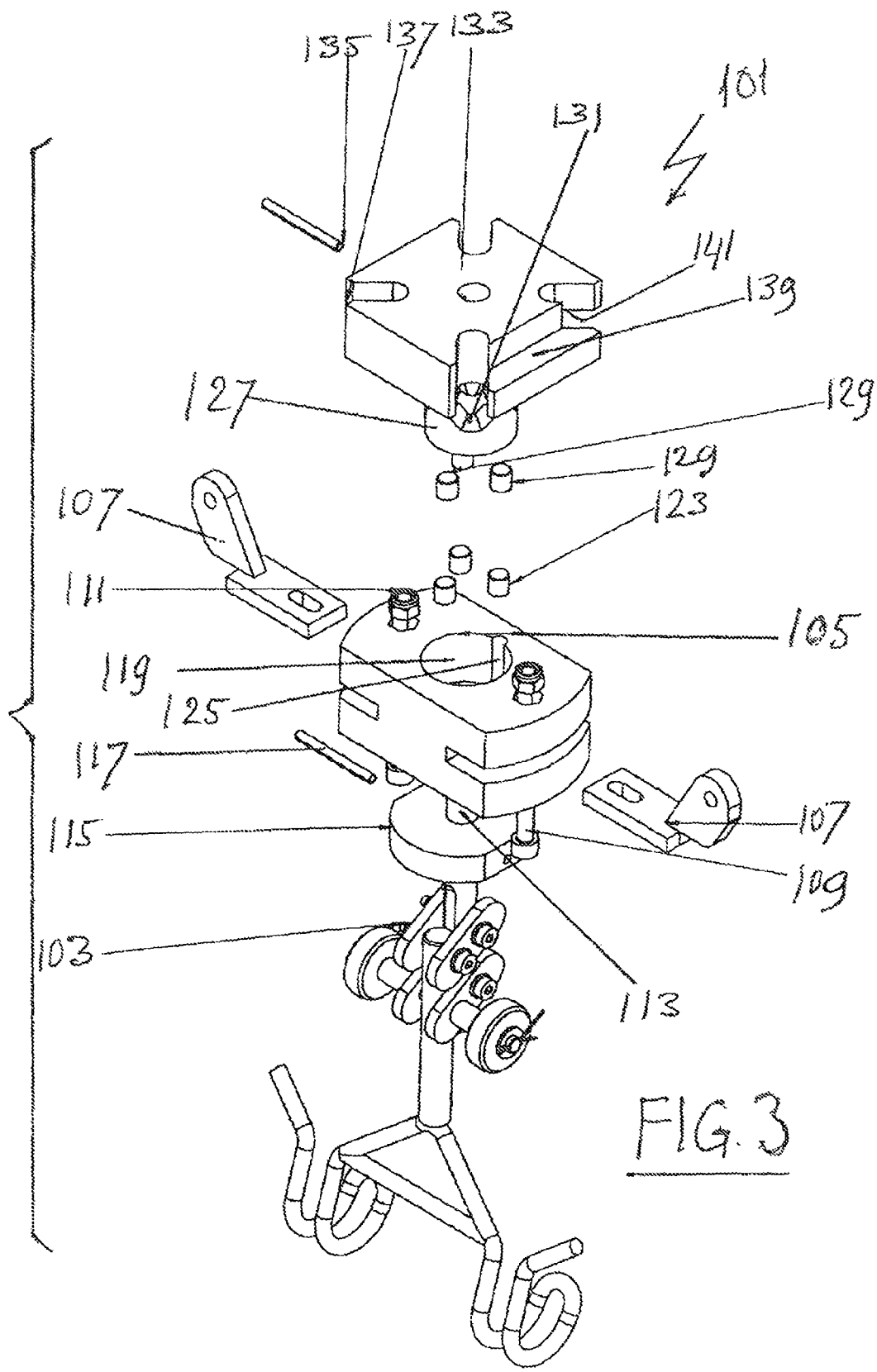
FIG. 3 is an exploded perspective illustration of an alternative rotatable article support.
Figure 4:
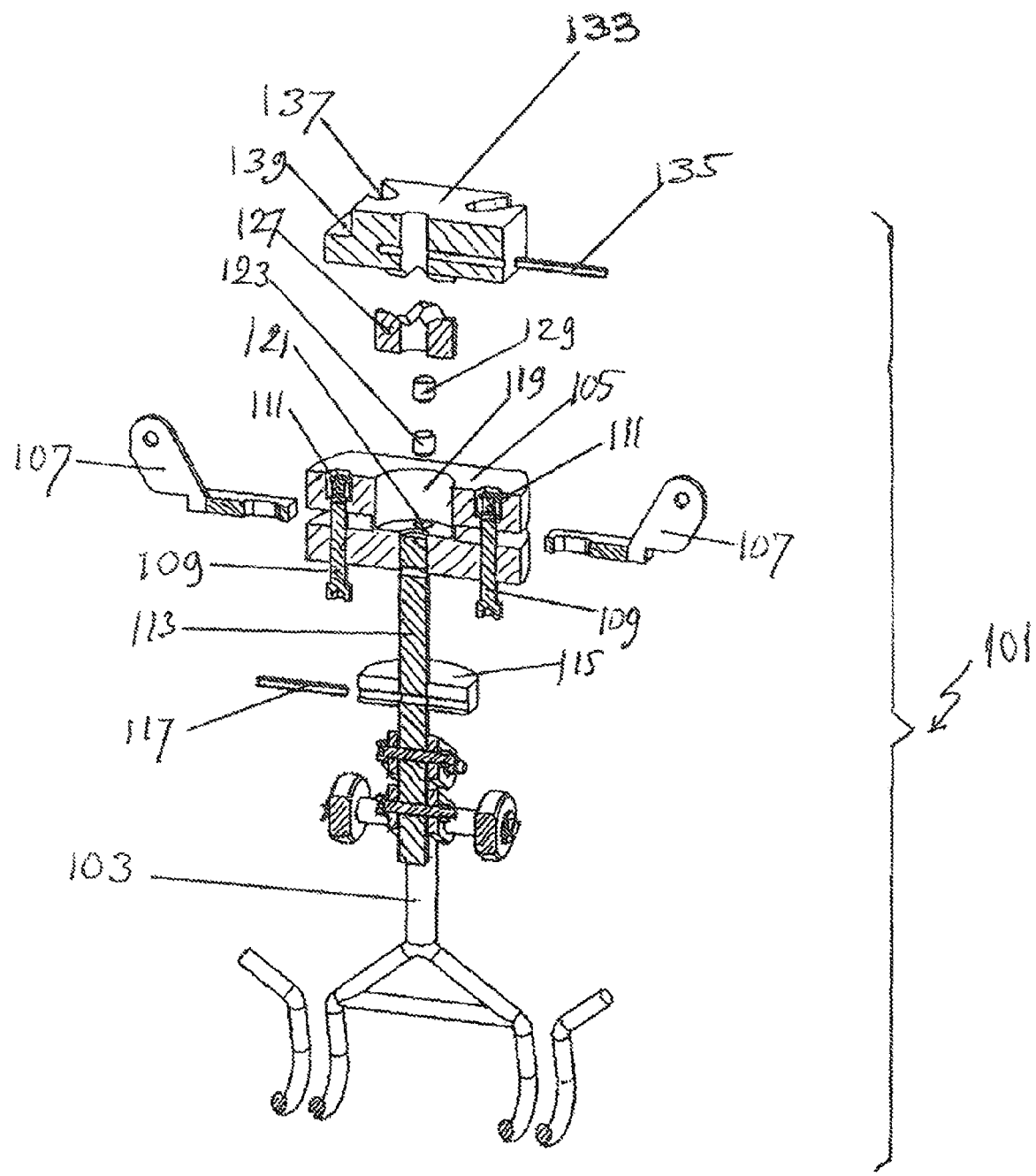
FIG. 4 is a cross section of the exploded perspective illustration of FIG. 3.

In FIG. 3 an exploded arrangement is shown of a rotatable article support assembly 101. The article support assembly 101 is provided with a shackle 103, which in this example is a so called weighing shackle for the suspension of animal carcasses, such as fowl or poultry carcasses. The shackle 103 is rotatably suspended from a base block 105. The base block 105 is arranged for movement along an overhead conveyor rail or track (not shown, but conventional). Such conveyor rails or tracks are common in industrial apparatuses for carrying out a succession of processing steps. Commonly such conveying tracks are laid out in a continuous loop that defines a path of conveyance along a plurality of processing stations. Such systems are well known in the meat processing industry, but are also used in other disciplines of industry and manufacture. In this regard the base block 105 forms a trolley or carriage that is linked to similar base blocks of adjacent article support assemblies by trolley brackets 107 and chains, or the like. The trolley brackets 107 are attached to the base block 105 by means of bolts 109 and nuts 111. Extending upwardly from shackle 103 is a shaft 113 to which an abutment flange 115 is attached by means of a first transverse pin 117. The shaft 113 extends upwardly through a central bore in the base block 105, which central is enlarged at the upper end of the base block 105 to form a cavity 119. The cavity 119, as best seen in FIG. 4, has three bores 121 (only one being visible in FIG. 4) for each receiving a lower magnet 123. The cavity 119 has a groove 125 for non-rotatably receiving an indexing plunger 127 which has its perimeter adapted to the contour of cavity 119 to inhibit relative rotation but to allow axial movement of the plunger 127.

Not visible in FIGS. 3 and 4, but visible in the ghost views of FIGS. 5 and 6, the indexing plunger 127 has bores opening into its bottom surface for receiving upper magnets 129. In this example the lower magnets 123 are positioned with their north poles on top and the upper magnets 129 are positioned with their north poles facing down. In such an orientation, the lower and upper magnets 123, 129 will repulse one another, so that the indexing plunger 127 carries a number of radial indexing formations 131, which cooperate with complementary indexing formation on a lower face of a turning gear, or turning block 133. In this example, the indexing formations 131 provide rotational positions that are 90° apart. The turning block 133 is mounted to the shaft 113 by means of a second transverse pin 135. Spacing between transverse bore in the shaft 113 for receiving the first and second transverse pins 117, 135 is such that the base block 105 is snugly and rotatably received between the abutment flange 115 and the turning block 133. Thereby also the indexing plunger 127 is held within the cavity 119 of the base block 105 against the repulsive forces of the confronting lower and upper magnets 123, 129. The magnets 123, 129 are preferably identical and sintered rare earth magnets. Such sintered rare earth magnets may contain neodymium or be ceramic magnets of ferrous material. Another suitable magnet material may be samarium cobalt. The polarity of the lower and upper magnets 123, 129 should be properly directed to obtain the repulsive force necessary to bias the indexing formation 131 in engagement with the turning block 133. This can be with the north poles of confronting magnets facing one another, but may also be achieved by having the south poles facing one another. The important aspect is that equal poles of confronting magnets are facing one another. The turning block 133 further has diagonal slots 137 extending diagonally inwardly from each corner of the substantially square contour of the turning block 133.

In FIGS. 5 and 6 a side and a rear elevation of the assembled article support assembly 101 are illustrated as ghost views. Thereby internal parts like the magnets 123, 129, the indexing plunger 127 and the indexing formations 131 are visible as if the base block 105 and the turning block 133 were of transparent material. Also best visible in FIGS. 5 and 6 is that the turning block 133 has an upper cut-out 139 along one edge extending between adjacent slots 137, as well as a lower cut-out 141 along another edge that is perpendicular to the one edge.

Figure 7:
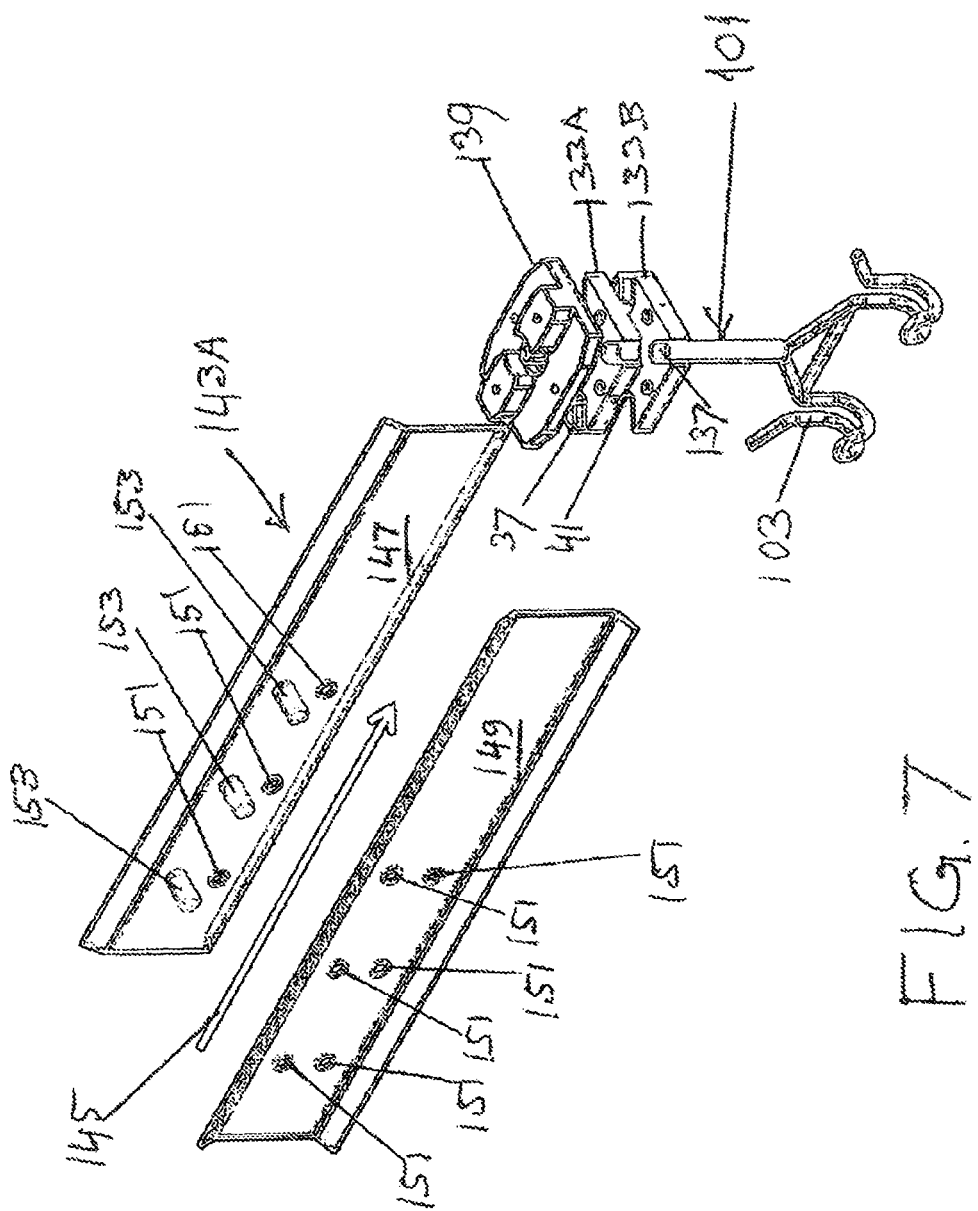
FIG. 7 shows a first arrangement of turning pins in relation to a first output position for the article support.

The purpose of the upper and lower cut-outs will now be described in reference to FIGS. 7 to 10. In FIGS. 7 to 10 several output positions are shown for the article support assembly 101, after having passed a particular aligning, or turning station 143A, 143B, 143C, 143D in a direction of conveyance indicated by arrow 145. The representation of FIGS. 7 to 10 is essentially schematic and structure that is not directly relevant to a correct understanding of the disclosure, is omitted for clarity. Also the article support assembly 101 is shown in a simplified form with the turning block 133 separated in two levels of disks 133A, 133B to better visualise the upper and lower cut-outs 139, 141. Each of the turning stations 143A-143D has opposed left and right hand guiding walls 147, 149. Each right hand guiding wall 147, 149 has a series of openings 151 in a upper and a lower row, each consisting of three openings 151. Each opening 151 is adapted to selectively receive a turning pin 153. As shown in FIG. 7, three turning pins 153 are successively arranged in the upper row of openings 151 of the left hand guiding wall 47. Irrespective of the rotational position of the article support assembly 101 when it enters the turning station 143A, the three successive turning pins 153 in the upper row will always be sufficient to engage as many of the diagonal slots 137 as is necessary to bring the upper cut-out 139 (in level 133A of the turning block) in a position facing the left hand guide rail 147, once it has passed all three turning pins 153.

Figure 8:
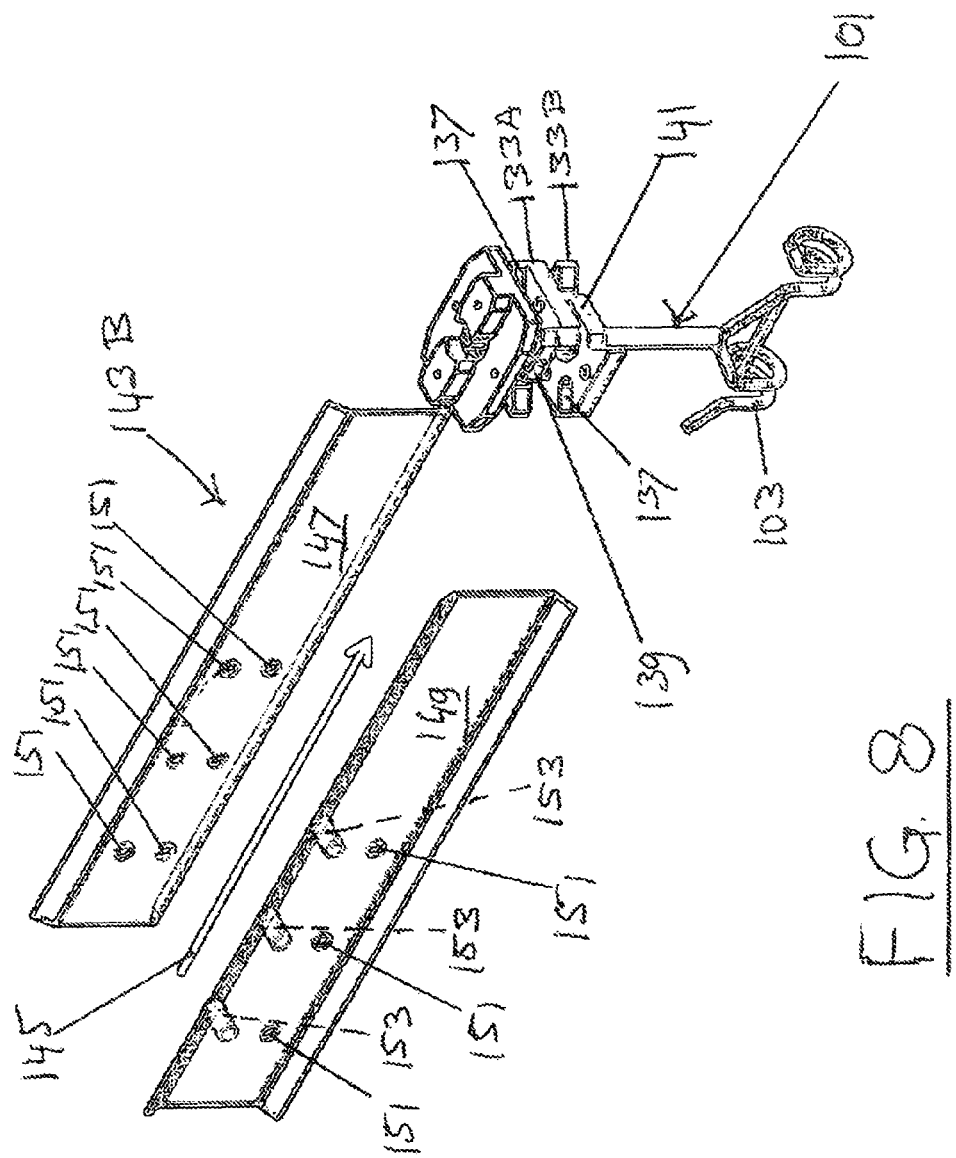
FIG. 8 shows a second arrangement of turning pins in relation to a second output position of the article support.

As shown in FIG. 8, three turning pins 153 are now mounted in the upper row of three opening 151 of the right hand guiding wall 149. This has the effect that article supported assembly 101 will now leave the turning station 143B with the upper cut-out 139 facing the right hand guiding wall 149. This results in a different position of the shackle 103 than that achieved with the turning station 143A of FIG. 7.

In FIG. 9 again a different arrangement of turning station 143C is shown. In this variation the three successive turning pins 153 are positioned in the lower row of opening 151 of the left hand guiding wall 147. The pins 153 now engage the diagonal slots 137 at the lower portion 133B of the turning block. Upon passage of the article support assembly 101 through the turning station 143C in the direction 145 of conveyance, the lower cut-out 141 will emerge from the turning station 143C, facing the left hand guide wall 147.

In a further variation according to FIG. 10, the turning station 143D has the successive turning pins 153 installed on the lower row of openings 151 in the right hand guide wall 149. This results in the lower cut-out 141 of the lower portion 133B of the turning block to emerge from the turning station 143D facing the right hand side wall 149. While one level of turning pins 153 that are 180° apart, using a second level for positioning the turning pins and a second cut-out at 90° from the first cut-out, enables positioning of the article support assembly 101 at predetermined position at 90°.

Accordingly an article support assembly 101 is disclosed that is adapted for movement by a conveyor along a path of conveyance. The article support assembly 101 includes a trolley 105 for engagement by the conveyor and a shackle 103 configured to support an article, and rotatable with respect to the trolley. A turning block 133 is associated with the shackle 103, and rotation of the turning block with respect to the trolley 105 causes corresponding rotation of the shackle relative to the trolley. Yieldable indexing means 123, 127, 129, 131 are operatively arranged between the trolley 105 and the turning block 133 to define at least a first and a second incremental rotational position for the shackle 103. The yieldable indexing means 123, 127, 129, 131 of the article support assembly 101 are biased into engagement by magnetic repelling forces. A conveyor system for conveying articles along processing stations is adapted to include the article support assembly 101 and comprises a turning station 143A, 143B, 143C, 143D for giving a predetermined rotational position to the shackle 3 with respect to the trolley 105.

While it has been described in the above example that the indexing plunger 127 and the turning block providing the yieldable indexing means are biased into engagement by magnetic repelling forces, it is alternatively also possible to obtain this bias by attracting magnetic forces. This effect can be obtained by positioning lower magnet in the indexing plunger 127, and accommodating upper magnets in suitable bores in the turning block 133, but with the confronting lower and upper magnets then positioned to have their opposite poles facing one another.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. Article support assembly for movement by a conveyor along a path of conveyance, including:
   a trolley for engagement by the conveyor;
   a shackle configured to support an article, and rotatable with respect to the trolley;

a turning block associated with the shackle, rotation of the turning block with respect to the trolley causing corresponding rotation of the shackle relative to the trolley; and yieldable indexing means operatively arranged between the trolley and the turning block to define at least a first and a second incremental rotational position for the shackle, wherein the yieldable indexing means are biased into engagement by magnetic forces.

2. Article support assembly according to claim 1, wherein the yieldable indexing means are biased into engagement by magnetic repelling forces.

3. Article support assembly according to claim 2, wherein the yieldable indexing means include a lower magnet and an upper magnet and the lower and upper magnets being positioned so that equal poles of confronting magnets are facing one another.

4. Article support assembly according to claim 1, wherein the yieldable indexing means defines a total of four indexing positions.

5. Article support assembly according to claim 1, wherein the yieldable indexing means comprises three pairs of lower and upper magnets in a regularly spaced arrangement.

6. Article support assembly according to claim 1, wherein the shackle is adapted to support a poultry carcass.

7. The article support of claim 1, wherein the magnetic forces are produced by Neodymium magnets.

8. The article support of claim 1, wherein the article support comprises a suspension hook for supporting fowl or poultry carcasses by their legs from the overhead conveyor track.

9. The article support of claim 1, wherein the article support comprises a shackle with first and second hooks depending therefrom for receiving the leg parts of fowl or poultry carcasses.

10. Article support assembly for movement by a conveyor along a path of conveyance, comprising:
a trolley for engagement by the conveyor;
a shackle configured to support an article, and rotatable with respect to the trolley;
a turning block associated with the shackle, rotation of the turning block with respect to the trolley causing corresponding rotation of the shackle relative to the trolley; and
yieldable indexing means operatively arranged between the trolley and the turning block to define at least a first and a second incremental rotational position for the shackle,
the yieldable indexing means being biased into engagement by magnetic forces; and
wherein the turning block has a substantially rectangular perimeter contour with diagonal slots extending radially inwardly from each corner, and further includes an upper cut-out along one perimeter edge extending between adjacent slots, and a lower cut-out extending along another perimeter edge that is perpendicular to the one perimeter edge.

11. Article support assembly for movement by a conveyor along a path of conveyance, the article support assembly comprising:
a trolley for engagement by the conveyor;
a shackle configured to support an article, the shackle being rotatable relative to the trolley;
a turning block associated with the shackle, rotation of the turning block with respect to the trolley causing corresponding rotation of the shackle relative to the trolley;

yieldable indexing arrangements operatively arranged between the trolley and the turning block to define at least a first and a second incremental rotational position for the shackle,
wherein the yieldable indexing arrangements are biased into operative engagement by magnetic forces; and
wherein the trolley is a carriage for engagement by the conveyor, the shackle is a holder for supporting an article, the turning block is a turning gear that enables rotation of a supported article about a vertical axis with respect to the carriage in response to the carriage being moved past a turning station positioned along the conveying path, and wherein the indexing means include first and second pairs of confronting magnetic elements, each being positioned to yieldably lock the turning gear in accordance with the relevant first and second incremental rotational positions.

12. The article support of claim 11, wherein the indexing means indexes a third position of incremental rotation and includes a confronting third pair of confronting magnetic elements.

13. The article support of claim 12, wherein the indexing means indexes a fourth position of incremental rotation and includes a confronting fourth pair of confronting magnetic elements.

14. The article support of claim 13, wherein the turning gear includes a turning cross having a substantially square peripheral contour with four corner apexes and defining inwardly extending slots opening into the corner apexes, the slots being arranged for engagement by a turning station.

15. The article support of one of claims 11, wherein the pairs of confronting magnetic elements each include an upper magnet in a lower face of the carriage and a lower magnet in an upper face of the turning cross.

16. The article support of claim 15, wherein the lower face of the carriage is part of a separately mounted base part of the carriage.

17. The article support of claim 16, wherein the turning cross is rotatably mounted to the base part.

18. The article support of claim 11, wherein the carriage includes a chain block for receiving a conveyor chain.

19. The article support of claim 11, wherein the carriage is adapted to be supported for movement along an overhead conveyor track.

20. An article support assembly for movement by a conveyor along a path of conveyance, the article support assembly comprising:
a trolley configured for engagement with the conveyor;
a shackle extending from the trolley and being configured to support an article, the shackle being rotatably mounted relative to the trolley;
a turning block disposed adjacent the trolley and being coupled to the shackle such that rotation of the turning block with respect to the trolley causes corresponding rotation of the shackle relative to the trolley; and
at least one magnet arranged on the trolley and at least one magnet arranged on the turning block, the at least one magnet on the trolley interacting magnetically with the at least one magnet on the turning block to define at least two incremental rotational positions of the turning block and shackle relative to the trolley.

21. The article support assembly of claim 20 wherein the at least one magnet on the trolley interacts with the at least one magnet on the turning block within a space between the turning block and the trolley.

22. The article support assembly of claim 21 wherein the at least one magnet on the trolley interacts with the at least one magnet on the turning block through magnetic attraction.

23. The article support assembly of claim 21 wherein the at least one magnet on the trolley interacts with the at least one magnet on the turning block through magnetic repulsion.

24. The article support assembly of claim 20 comprising at least two magnets arranged on at least one of the trolley and the turning block.

25. The article support assembly of claim 24 wherein the number of magnets arranged on the trolley and the number of magnets arranged on the turning block are the same.

26. The article support assembly of claim 25 comprising four magnets arranged on the trolley and four magnets arranged on the turning block, the magnets interacting to define four incremental rotational positions of the turning block and the shackle relative to the trolley.

27. The article support assembly of claim 26 wherein the magnets are arranged such that the four incremental rotational positions are substantially ninety degrees apart.

* * * * *